July 4, 1967
S. C. BELL ET AL
3,329,676
FUSED 1,4-DIAZEPINE RING SYSTEMS
Filed Nov. 9, 1964
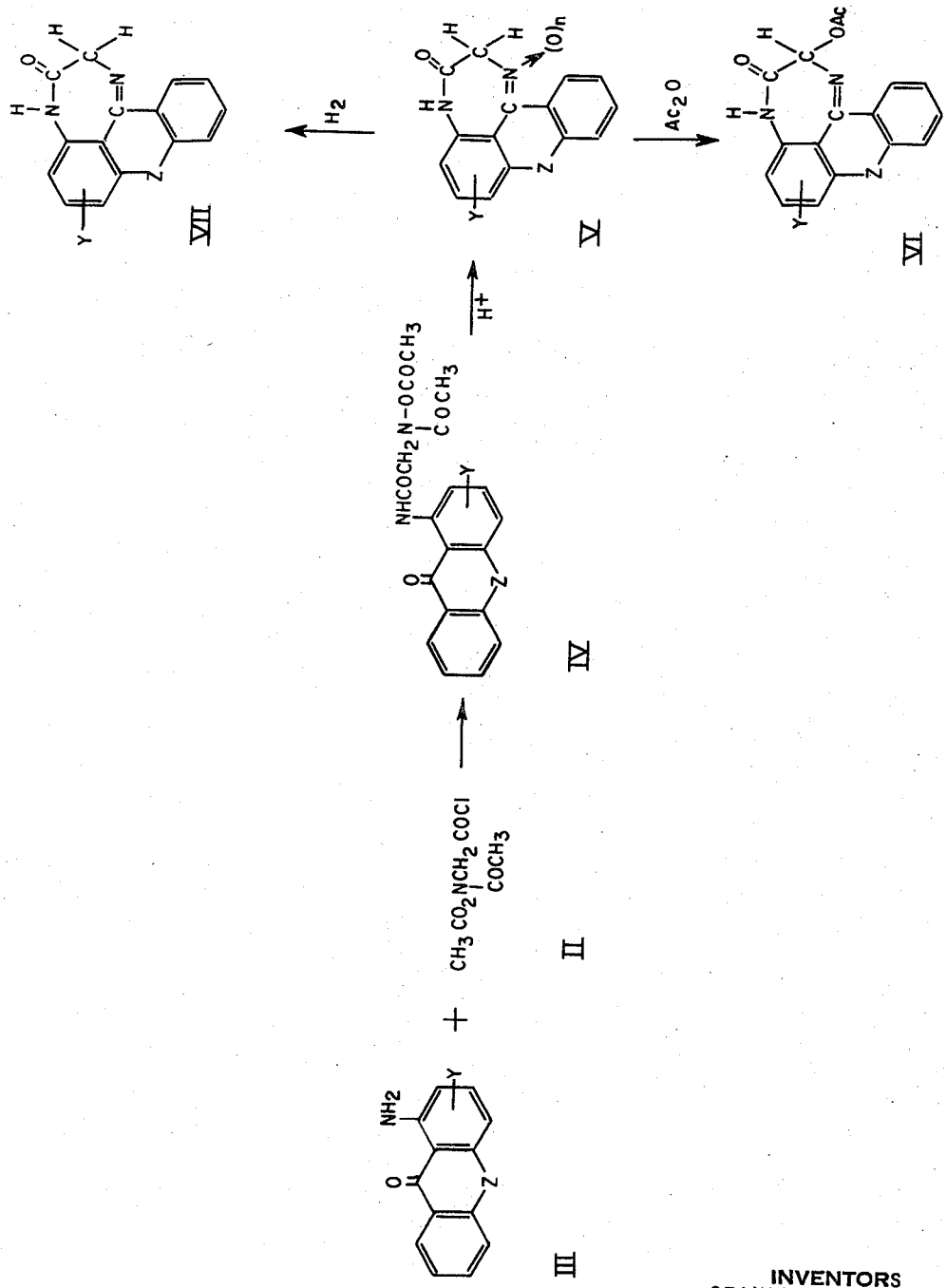
INVENTORS
STANLEY C. BELL
SCOTT J. CHILDRESS
BY
/ATTORNEY 3,329,676
FUSED 1,4-DIAZEPINE RING SYSTEMS
Stanley C. Bell and Scott J. Childress, Philadelphia, Pa., assignors to American Home Products Corporation, New York, N.Y., a corporation of Delaware
Filed Nov. 9, 1964, Ser. No. 409,818
4 Claims. (Cl. 260—239.3)

This invention is concerned with compounds having the 5-phenol-1,4-benzodiazepine nucleus to which is attached in the 6-position thereof a divalent element so joined to the 5-phenyl substituent in the ortho-position that a new ring is formed. The invention is also concerned with intermediates occurring in the preparation of these compounds.

As determined by standard test procedures in warm-blooded animals, the claimed final products have central nervous system activity, including anticonvulsant and depressant effects and also exhibit mydriatic activity.

The claimed final products are represented by the following general formula:

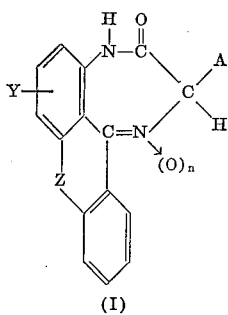

(I)

In the above formulae, Z can be a direct bond, a sulfur atom, an oxygen atom, an imino radical, a methylene group, an ethylene group, or an ethylidene group. Y can be hydrogen, halogen, preferably chlorine or bromine, (lower)alkyl or halo(lower)alkyl. A is hydrogen, or acetoxy; $n$ is 0 or 1, except when A is acetoxy in which case it is 0.

The reactions whereby the claimed compounds are prepared are illustrated graphically in the attached figure, to which the Roman numerals in parenthesis in the following description refer.

The starting materials used in the preparation of the claimed compounds are generally known or can be prepared by well-known procedures. Thus the starting N-acetoxy)acetamidoacetyl chloride (II) is prepared by heating hydroxyaminoacetic acid with acetic anhydride, removing the solvent, and heating the residue in methylene chloride with thionyl chloride.

As shown in the accompanying flowsheet, the claimed compounds are prepared by reacting an N-(acetoxy)-acetamidoacetyl chloride (II) with a fused ring compound (III) which has an amino function and an oxygen function separated by a three carbon atom chain. This reaction is effected by dissolving compound (II) in a solvent such as methylene chloride and adding the resulting solution, at room temperature, to a solution containing compound (III), in a similar solvent. The reaction mixture is filtered, and the filtrate is concentrated to yield a compound of Formula (IV). Treatment of this compound (IV) with a mineral acid causes the same to undergo ring closure thereby forming the corresponding 2,4-dihydro(1,4)diazepin-3-one 1-oxide (V). Compound (V) can be treated conventionally with phosphorus trichloride or with hydrogen in the presence of a catalyst to afford compound (VII). Compound (V) can also be acylated in the 2-position conventionally by heating with an alkanoic anhydride such as acetic anhydride to form the corresponding 2-acyloxy compound (VI). In turn compound (VI) can be hydrolysed with acid or base to form the corresponding 2-hydroxy(1,4)diazepin-3-one. The latter compound may be obtained also by an alternate route by treating compound (IV) with ammonia to cause the same to undergo ring closure thereby forming a 2-acetylamino (1,4)diazepin-3-one. In turn, this compound can be hydrolyzed conventionally to yield the corresponding 2-amino compound which can be diazotized to give the above-mentioned 2-hydroxy-(1,4)diazepin-3-one.

The accompanying example serve to illustrate specific details of the preparation of the claimed compounds.

*Example 1.*—2-[acetyl(hydroxy)amino]-N-(9-oxofluoren-1-yl)-acetamide, acetate

Compound (II) was prepared by heating a mixture of 4.5 g. of hydroxyaminoacetic acid in 60 ml. of acetic anhydride for 15 minutes at 80°. The solvent was removed in vacuo and the residue dissolved in 60 ml. of methylene chloride and 14 ml. of thionyl chloride and refluxed for 10 minutes. The solvent was removed in vacuo and the residue (II) was dissolved in 50 ml. of methylene chloride and added to a solution of 15.0 g. (2 equiv.) of 1-amino-fluorenone in 200 ml. of methylene chloride and filtered from the insoluble hydrochloride salt of the starting amine. The filtrate was concentrated to dryness and the residue was recrystallized from acetonitrile giving 9.6 g. (71%) of product, M.P. 170–173. Further recrystallization from acetonitrile gave a pure compound, M.P. 178–180°.

*Analysis.*—Calcd. for $C_{19}H_{16}N_2O_5$: C, 64.76; H, 4.58; N, 7.95. Found: C, 64.56; H, 4.42; N, 8.01.

*Example 2.*—2,4-dihydro-3H-fluoreno[1,9-e,f]-(1,4)diazepin-3-one 1-oxide

A mixture of 0.4 g. of 2-[acetyl(hydroxy)amino]-N-(9-oxofluoren-1-yl) acetamide, acetate, 10 ml. of ethanol and 2 ml. of 6 N hydrochloric acid was heated to boiling. The starting material dissolved and soon the product precipitated out. On cooling, there was filtered off 0.23 g. of pure product, M.P. 215–217°.

*Analysis.*—Calcd. for $C_{15}H_{10}N_2O_2$: C, 71.99; H, 4.03; N, 11.20. Found: C, 72.00; H, 3.98; N, 11.13.

*Example 3.*—2,4-dihydro-2-hydroxy-3H-fluoreno-[1,9-e,f](1,4)diazepin-3-one, acetate A mixture of 1.5 g. of 2,4-dihydro-3H-fluoreno [1,9-e,f](1,4)diazepin-3-one 1-oxide and 40 ml. of acetic anhydride was heated on the steam bath for 1¼ hours. After cooling, there was filtered off 1.0 g. of crystalline product, M.P. 226–227°.

*Analysis.*—Calcd. for $C_{17}H_{12}N_2O_3$: C, 69.85; H, 4.14; N, 9.59. Found: C, 69.75; H, 4.02; N, 9.47.

*Example 4.*—2,4-dihydro-3H-fluoreno[1,9-e,f](1,4)diazepin-3-one

A suspension of 1 g. of 2,4-dihydro-3H-fluoreno [1,9-e,f](1,4)diazepin-3-one 1-oxide in 50 ml. of aqueous alcohol and 1 ml. of 6 N HCl is shaken in the presence of 0.5 g. of 5% of palladium on charcoal with $H_2$ until one mole of hydrogen is consumed. The filtered solution is concentrated in vacuo and neutralized with sodium carbonate. The product 2,4-dihydro-3H-fluoreno[1,9-e,f] (1,4)diazepin-3-one is recrystallized from acetonitrile.

*Example 5.*—1-[2-acetyl(hydroxy)aminoacetamido]-4-methyl-thioxanthene-9-one, acetate This compound, M.P. 204–206°, was prepared from 3.9 g. of 1-amino-4-methylthioxanthene-9-one and 1.5 g. hydroxyaminoacetic acid according to the procedure of Example 1.

*Analysis.*—Calcd. for $C_{20}H_{18}N_2O_5S$: C, 60.29; H, 4.55; N, 7.03; S, 8.05. Found: C, 60.04; H, 4.25; N, 7.19; S, 7.9.

Using the appropriate starting compounds, the following products are also prepared as above described. These products are listed in tabular form to avoid unnecessary repetition of experimental details.

| Example | Formula | Z | Y |
|---|---|---|---|
| 6 | IV | S | H |
| 7 | IV | O | H |
| 8 | IV | NH | Cl |
| 9 | IV | $CH_2$ | Br |
| 10 | IV | $CH_2CH_2$ | $CH_3$ |
| 11 | IV | CH=CH | H |
| 12 | IV | O | $CF_3$ |
| 13 | V | S | H |
| 14 | V | O | H |
| 15 | V | NH | Cl |
| 16 | V | $CH_2$ | Br |
| 17 | V | $CH_2CH_2$ | $CH_3$ |
| 18 | V | CH=CH | H |
| 19 | V | O | $CF_3$ |
| 20 | VI | S | H |
| 21 | VI | O | H |
| 22 | VI | NH | Cl |
| 23 | VI | $CH_2$ | Br |
| 24 | VI | $CH_2CH_2$ | $CH_3$ |
| 25 | VI | CH=CH | H |
| 26 | VI | O | $CF_3$ |

Considerable modification is possible in the selection of the particular reactants as well as in the techniques followed without departing from the scope of the invention as claimed below.

The compounds of the present invention can be prepared and administered in a wide variety of oral and parenteral dosage forms, singly, or, in combination with other coacting compounds. They can if desired be associated with a carrier which can be a solid material or a liquid in which the compound is dissolved, dispersed, or suspended. The solid compositions can take the form of tablets, powders, capsules, pills, or the like, preferably in unit dosage forms for simple administration or precise dosages. The liquid composition can take the form of solutions, emulsions, suspensions, syrups, or elixirs. Such conventional solid carriers as sucrose, starches, etc., or liquid vehicles such as non-toxic alcohols, glycerine, or the like, may be thus used.

What is claimed is:
1. A compound of the formula:

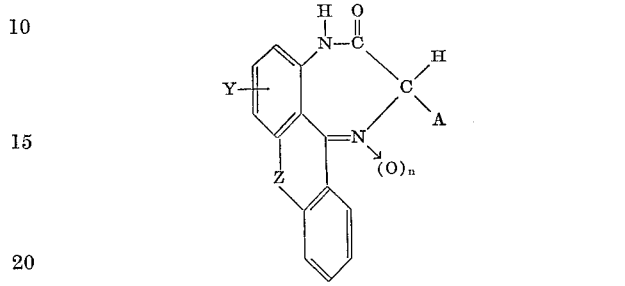

wherein Z is selected from the group consisting of a direct bond, a sulfur atom, an oxygen atom, the imino radical, methylene, ethylene and ethylidene; Y is selected from the group of hydrogen, halogen, (lower)alkyl and halo(lower)alkyl; A is selected from the group of hydrogen and acetoxy; $n$ is an integer ranging from 0 to 1.

2. 2,4-dihydro - 3H - fluoreno[1,9-e,f](1,4)diazepin-3-one 1-oxide.

3. 2,4 - dihydro-2-hydroxy-3H-fluoreno[1,9-e,f](1,4)diazepin-3-one, acetate.

4. 2,4-dihydro - 3H - fluoreno[1,9-e,f](1,4)diazepin-3-one.

No references cited.

WALTER A. MODANCE, *Primary Examiner.*
ROBERT T. BOND, *Assistant Examiner.*